United States Patent
Tamm et al.

(10) Patent No.: US 8,589,150 B2
(45) Date of Patent: Nov. 19, 2013

(54) SYSTEM, METHOD AND COMPUTER PROGRAM PRODUCT FOR DYNAMICALLY CORRECTING GRAMMAR ASSOCIATED WITH TEXT

(75) Inventors: Steven Tamm, San Francisco, CA (US); Shawna Wolverton, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 427 days.

(21) Appl. No.: 12/985,272

(22) Filed: Jan. 5, 2011

(65) Prior Publication Data

US 2011/0224973 A1 Sep. 15, 2011

Related U.S. Application Data

(60) Provisional application No. 61/312,958, filed on Mar. 11, 2010.

(51) Int. Cl.
*G06F 17/27* (2006.01)
(52) U.S. Cl.
USPC .......................................................... 704/9
(58) Field of Classification Search
USPC .......................................................... 704/9
See application file for complete search history.

(56) References Cited

U.S. PATENT DOCUMENTS

| | | | |
|---|---|---|---|
| 5,437,036 A * | 7/1995 | Stamps et al. | 719/328 |
| 7,209,929 B2 | 4/2007 | Dominguez, Jr. et al. | |
| 7,698,160 B2 | 4/2010 | Beaven et al. | |
| 7,747,434 B2 * | 6/2010 | Flanagan et al. | 704/235 |
| 7,921,370 B1 * | 4/2011 | Legault | 715/762 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | |
| 2005/0065925 A1 | 3/2005 | Weissman et al. | |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2007/0016401 A1 * | 1/2007 | Ehsani et al. | 704/9 |

OTHER PUBLICATIONS

U.S. Appl. No. 60/828,192, filed Oct. 4, 2006.

* cited by examiner

*Primary Examiner* — Susan McFadden
(74) *Attorney, Agent, or Firm* — Zilka-Kotab, PC

(57) ABSTRACT

In accordance with embodiments, there are provided mechanisms and methods for dynamically correcting grammar associated with text. These mechanisms and methods for dynamically correcting grammar associated with text can enable enhanced data display, simplified language support, etc.

20 Claims, 5 Drawing Sheets

SYSTEM, METHOD AND COMPUTER PROGRAM PRODUCT FOR DYNAMICALLY CORRECTING GRAMMAR ASSOCIATED WITH TEXT

CLAIM OF PRIORITY

This application claims the benefit of U.S. Provisional Patent Application 61/312,958, entitled "Grammar Engine Rewrite," by Tamm et al., filed Mar. 11, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to displaying text within an application, and more particularly to correcting grammar associated with the display of such text.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems commonly allow for a display of text associated with data displayed to one or more users associated with the systems. For example, a tab or label associated with system data displayed to the user may provide the user with information about the displayed data (e.g., a label may state that the system data is "Account Data," etc.). Unfortunately, techniques for altering the text and supporting such alterations have been associated with various limitations.

Just by way of example, traditional methods of allowing alterations of text may not account for grammatical differences in all instances created by changing the original text to the altered text. In another example, traditional methods of supporting multiple languages within an application while allowing alterations of text may necessitate hard-coding individual supported languages within the application. Accordingly, it is desirable to provide techniques that improve the implementation of grammar correction associated with the display of text.

BRIEF SUMMARY

In accordance with embodiments, there are provided mechanisms and methods for dynamically correcting grammar associated with text. These mechanisms and methods for dynamically correcting grammar associated with text can enable enhanced data display, simplified language support, etc.

In an embodiment and by way of example, a method for dynamically correcting grammar associated with text is provided. In one embodiment, a request from a user to change text within an application is received. Additionally, all instances of the text within the application are changed, according to the request. Further, grammar associated with the changed text is dynamically corrected when the changed text is displayed to the user, according to one or more rules associated with a language of the changed text.

While one or more implementations and techniques are described with reference to an embodiment in which dynamically collecting grammar associated with text is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for dynamically correcting grammar associated with text.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for dynamically correcting grammar associated with text will be described with reference to example embodiments.

Figure 1:
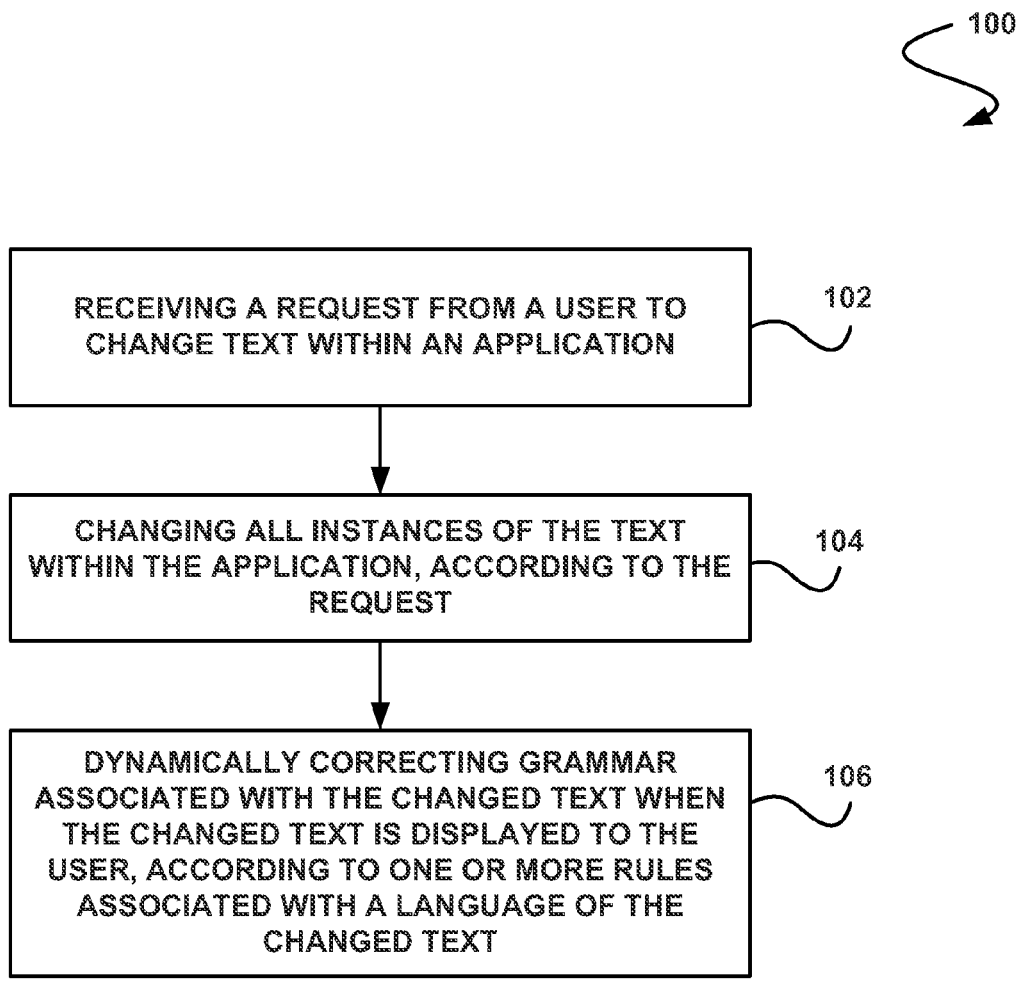
FIG. 1 illustrates a method for dynamically correcting grammar associated with text, in accordance with one embodiment.

FIG. 1 illustrates a method 100 for dynamically correcting grammar associated with text, in accordance with one embodiment. As shown in operation 102, a request from a user to change text within an application is received. In one embodiment, the user may include any individual associated with the application. For example, the user may include a subscriber to a service including the application, a purchaser of the application, an individual accessing the application via a network (e.g., a computer network, a cellular network, etc.), etc.

Additionally, in another embodiment, the application may include any software capable of displaying data to the user. For example, the application may include an interface (e.g., a graphical user interface (GUI), etc.), a report application, a management application, etc. In yet another embodiment, the application may be installed on a system (e.g., a client, a server, a multi-tenant on-demand database system, etc.).

Further, in one embodiment, the text within the application may include an identifier displayed by the application. For example, the text may include a label within the application (e.g., a name of an account, a name of a list of contacts, etc.), data displayed by the application (e.g., a name, a title, an occupation, etc.). Of course, however, the text within the application may include any text displayed by the application.

In another embodiment, the request to change the text within the application may be received as a result of the user selecting the text within the application (e.g., by clicking on the text, highlighting the text, etc.). In still another embodiment, the request to change the text may be received from an editor. For example, the user may select an option to edit the text within the application, and may be sent to an editor to request such changes to the text.

Further still, in one embodiment, the user may provide multiple forms of the changed text. For example, the user may provide one or more of the singular form of the changed text, the plural form of the changed text, the nominative form of the changed text, the accusative form of the changed text, the genitive form of the changed text, the dative form of the changed text, etc. In another embodiment, the form of the changed text may be automatically derived. In yet another embodiment, the request to change the text may include a request to change the gender of the text, a request to change the wording of the text from a word starting with a vowel to a word starting with a consonant, a request to change the text from singular to plural, etc.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, all instances of the text within the application are changed, according to the request. In one embodiment, the text may be stored in a database associated with the application, where such text is dynamically retrieved by the application to be displayed as needed. Additionally, the text stored in the database may be replaced with the changed text. In another embodiment, if the text includes multiple forms, all forms of the changed text provided by the user may be stored.

Further, as shown in operation 106, grammar associated with the changed text is dynamically corrected when the changed text is displayed to the user, according to one or more rules associated with a language of the changed text. In one embodiment, the changed text may be displayed to the user by the application when such text is requested by the user to be displayed. In another embodiment, dynamically correcting the grammar associated with the changed text may include correcting the display of additional text associated with the changed text (e.g., one or more associated conjunctions, pronouns, verbs, etc.).

For example, if the text before the user request is received is displayed to the user as "your account is located here," and the text "account" is changed by the user to "accounts," the text will then be corrected and displayed to the user with correct grammar as "your accounts are located here" instead of the grammatically incorrect display of "your accounts is located here." In another embodiment, the grammar may be dynamically corrected utilizing a grammar engine. For example, the grammar engine may analyze the text to be displayed within the application and may dynamically correct one or more portions of additional text associated with the text to be displayed.

In yet another embodiment, the language of the text may include the language in which the text is written. For example, the language of the test may include English, Spanish, Russian, etc. Further still, in one embodiment, the rules associated with the language of the text may include one or more grammatical rules. For example, the rules associated with the language of the text may include the declension used within the language. For instance, the declension associated with the language may describe the way the language structures one or more of nouns, adjectives, and articles within the language.

In another embodiment, a plurality of languages may be supported by the application. In yet another embodiment, the plurality of languages may be categorized. For example, each of the languages supported by the application may have associated rules (e.g., a type of declension, etc.) and may be categorized by their associated rules. In this way, languages having similar grammatical rules may be grouped together into categories that are associated with the grammatical rules.

Figure 2:
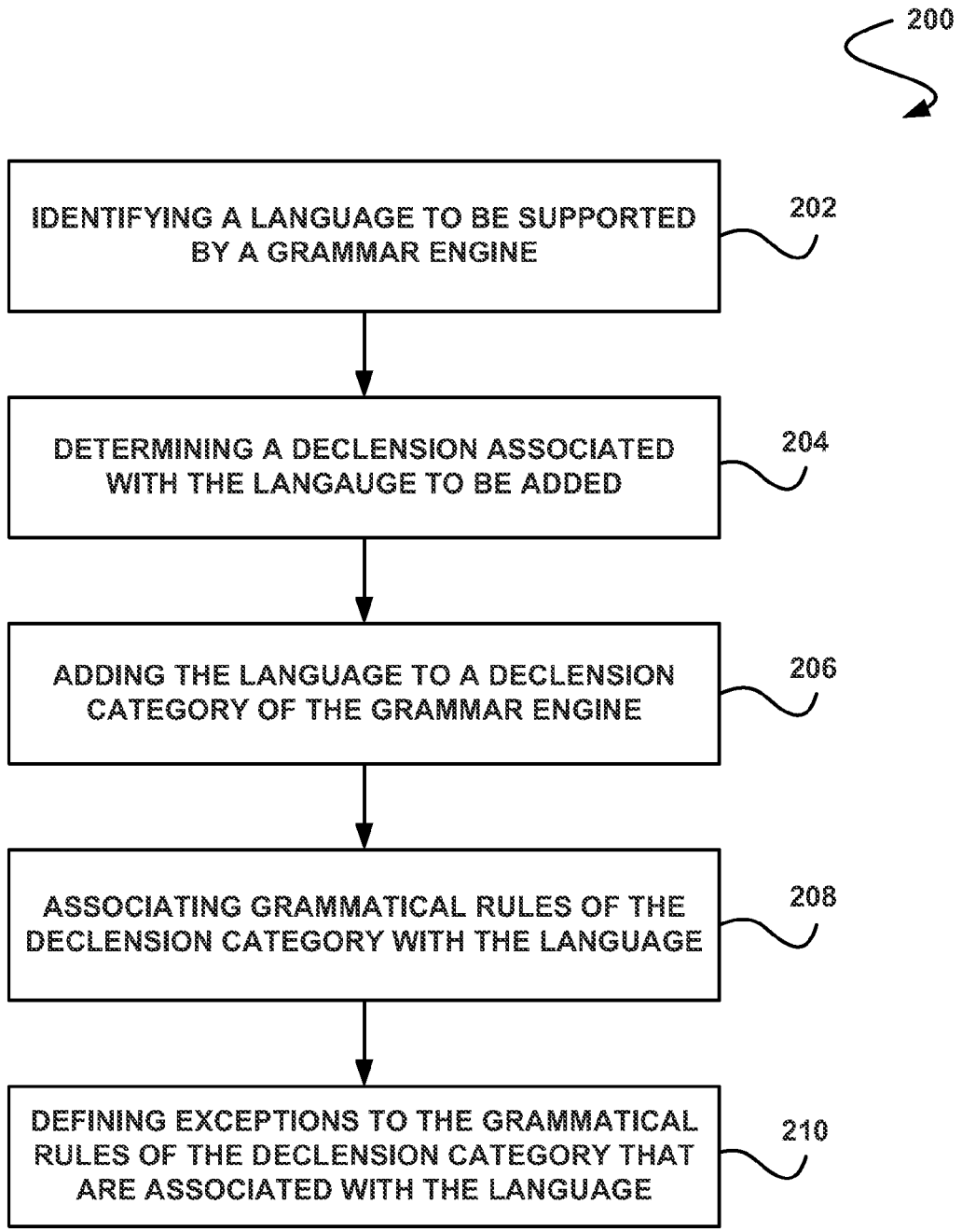
FIG. 2 illustrates a method for adding a newly supported language to a grammar engine, in accordance with another embodiment.

FIG. 2 illustrates a method 200 for adding a newly supported language to a grammar engine, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a language to be supported by a grammar engine is identified. In one embodiment, the grammar engine may include any software that enables the output of text in a grammatically correct manner. For example, the grammar engine may provide the ability for one or more customers of an application to "Rename" one or more tabs and labels within that application, and have label files of the application correctly use the new names in a way that is grammatically correct.

Additionally, as shown in operation 204, a declension associated with the language to be added is determined. Further, as shown in operation 206, the language is added to a declension category of the grammar engine. In one embodiment, the declension category may represent the declension used within the language. Table 1 illustrates an exemplary list of declension categories and members of each category. Of course, it should be noted that the list shown in Table 1 is set forth for illustrative purposes only, and thus should not be construed as limiting; in any manner.

TABLE 1

| Declension type | Examples of this declension type |
|---|---|
| Turkic | Finnish |
|  | Hungarian |
|  | Turkish |
| Simple | Chinese |
|  | Japanese |
|  | Korean |
|  | Thai |
| English | English |
|  | Indonesian |
| Romance | French |
|  | Italian |
|  | Portuguese |
| Slavic (West) | Czech |
|  | Polish |
|  | Serbian |
| Slavic (East) | Ukrainian |
|  | Russian |
|  | Bulgarian |
| Germanic | German |
| Semitic | Hebrew |
|  | Arabic |

Further still, as shown in operation 208, grammatical rules of the declension category within the grammar engine are associated with the added language. In one embodiment, grammatical rule metadata may be associated with the declension category of the language and may be accessed when the language is used, where the metadata describes how one or more words within the language are to be arranged, displayed, spelled, etc. Table 2 illustrates an exemplary list of declension details that may be articulated through metadata associated with each declension category. Of course, it should be noted that the list shown in Table 2 is set forth for illustrative purposes only, and thus should not be construed as limiting in any manner.

TABLE 2

| Declension type | Details |
|---|---|
| Turkic | number |
|  | case |
|  | possession |
| Simple | none |
| English | articles |
|  | number |
| Romance | gender |
|  | starts with |
|  | articles |
|  | number |
| Slavic (West) | gender |
|  | number |
|  | case |
| Slavic (East) | gender |
|  | number |
|  | case |
| Germanic | everything but possession |
| Semitic | gender |
|  | possession |
|  | case |
|  | number |
|  | article |

Also, as shown in operation 210, exceptions to the grammatical rules of the declension category that are associated with the added language are defined. For example, if the language to be added is Swedish, it may first be added to the Germanic declension category, and it may then be noted how the language differs from the general Germanic declension category (e.g., by having two genders, a definite article attached to the noun, etc.). In another embodiment, these exceptions may be stored with the added language.

In this way, languages may be quickly added to the grammar engine in a fast and efficient manner by reusing existing rules between similar languages without having to encode every rule for each newly added language. Additionally, the languages supported by the grammar engine may be stored in a system that defines interrelationships between available languages within the grammar engine.

Figure 3:
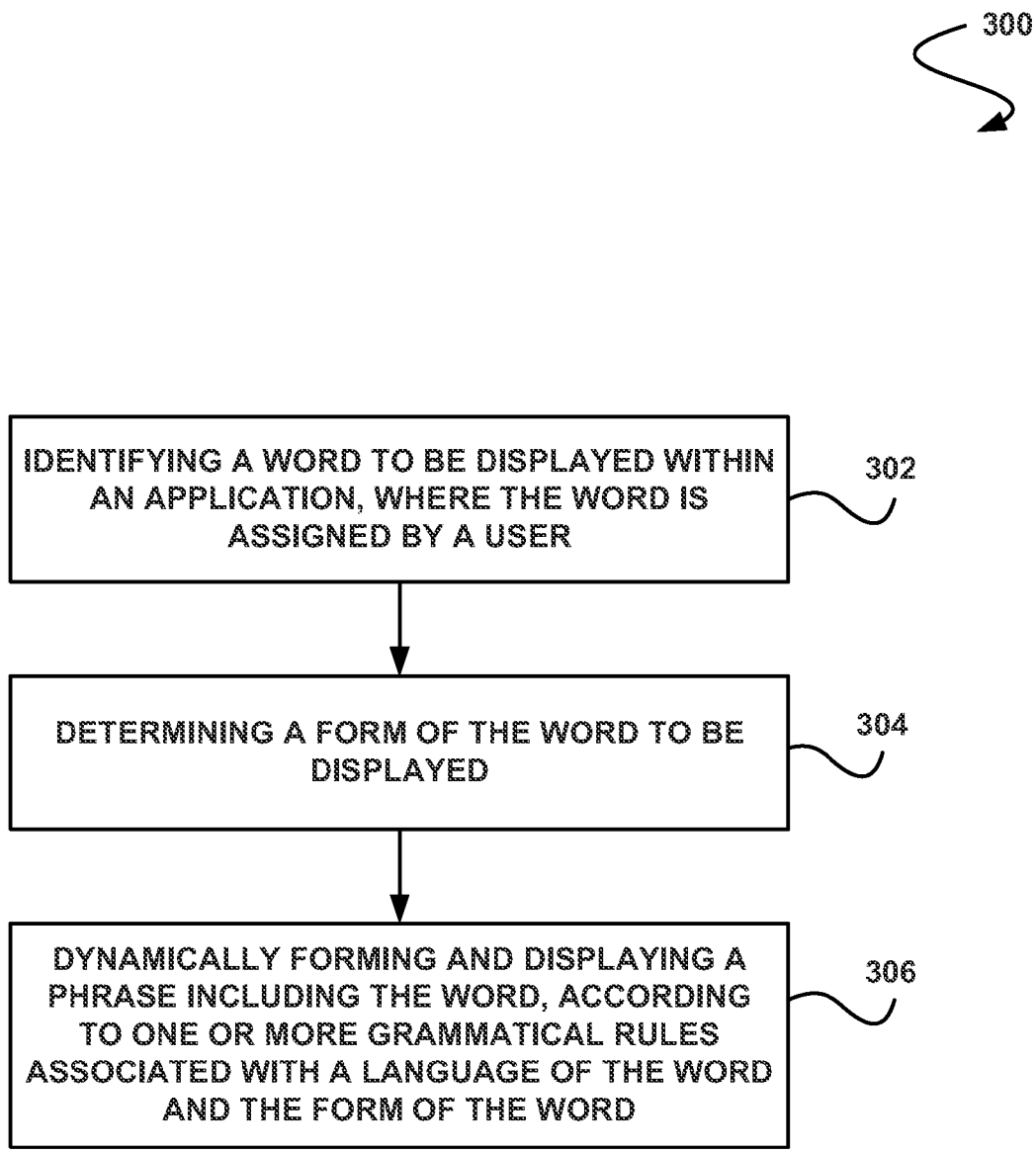
FIG. 3 illustrates a method for displaying a modified word in a grammatically correct manner, in accordance with another embodiment.

FIG. 3 illustrates a method 300 for displaying a modified word in a grammatically correct manner, in accordance with another embodiment. As an option, the present method 300 may be carried out in the context of the functionality of FIGS. 1-2. Of course, however, the method 300 may be carried out in any desired environment. The aforementioned definitions may apply during the present description.

As shown in operation 302, a word to be displayed within an application is identified, where the word is assigned by a user. In one embodiment, the word may be a noun changed from a previous noun displayed within the application by the user. For example, a label file may want to display a string like "Your request to update an account has succeeded," where a user has renamed the noun "account" to "clients," In another example, a user may change the gender of a noun from masculine to feminine.

Additionally, as shown in operation 304, a form of the word to be displayed may be determined. In one embodiment, the user may input one or more noun forms of the word when they assign the word within the application. For example, the user may include the masculine and feminine versions of the nominative form of the word, accusative form of the word, genitive form of the word, dative form of the word, etc. In another example, the user may indicate what form of the word is desired by the user.

Further, as shown in operation 306, a phrase including the word is dynamically formed and displayed, according to one or more grammatical rules associated with a language of the word and the form of the word. In one embodiment, the language and form of the word may be determined by the user, an organization associated with the user, etc. In another embodiment, the grammatical rules may also be configured by the user, an organization associated with the user, etc.

In another embodiment, the phrase may be dynamically formed utilizing one or more encoded strings. For example, the phrase to be displayed to the user may include a phrase encoded in Extensible Markup Language (XML) as "<My/><Accounts/>," where the noun variable "<Accounts/>" is changeable by the user. Additionally, if it is determined that the language is German, and the word under "<Accounts/>" that is to be displayed is assigned by the user as the feminine form "Kunde," then the adjective variable "<My/>" may be adjusted to display the feminine form of the German word "My," or "Meine," resulting in a displayed phrase of "Meine Kunde." In another example, if it is determined that the language is German, and the word under "<Accounts/>" that is to be displayed is assigned by the user as the masculine form "Kunto," then the adjective variable "<My/>" may be adjusted to display the masculine form of the German word "My," or "Meinen," resulting in a displayed phrase of "Meinen Kunto."

Additionally, in another embodiment, the phrase to be displayed to the user may include a phrase encoded in Extensible Markup Language (XML) as "<A/> <Account/>," where the noun variable "<Account/>" is changeable by the user. Additionally, if it is determined that the language is English, and the word under "<Account/>" that is to be displayed is assigned by the user as the word "Account," then the article variable "<A/>" may be adjusted to display the form of the word "A" that is associated with a noun starting with a vowel, or "An," resulting in a displayed phrase of "An Account." In another example, if it is determined that the language is English, and the word under "<Account/>" that is to be displayed is assigned by the user as the word "Client," then the article variable "<A/>" may be adjusted to display the form of the word "A" that is associated with a noun starting with a consonant, or "A," resulting in a displayed phrase of "A Client."

In another embodiment, an article variable, adjective variable, etc. within the word phrase may determine the noun closest to the variable in terms of physical location and may analyze that noun in order to determine a correct noun phrase.

Further, in yet another embodiment, a grammar engine associated with the application may utilize label files that are split into two different types—"sfdcnames.xml," which may contain all of the forms of grammatical terms (e.g., a dictionary of nouns and fields that the user may rename, along with all the forms of modifiers based on what is being renamed, etc.), and "labels.xml," which may contain labels that may be used by the application annotated with XML Tags that may correspond to the grammatical terms.

Additionally, the word to be displayed may be placed in "sfdcnames.xml" with an annotation saying it starts with a vowel, while in the label file a string to be presented to the user may be represented as "Your request to update <account article="a"/> has succeeded." In this way, at runtime, the article is resolved to either "a" or "an" based on the noun in "sfdcnames.xml" starting with a vowel or consonant. In this way, the grammar associated with the word phrase may be dynamically corrected at runtime e.g., when the word phrase is displayed to the user, etc.).

System Overview

Figure 4:
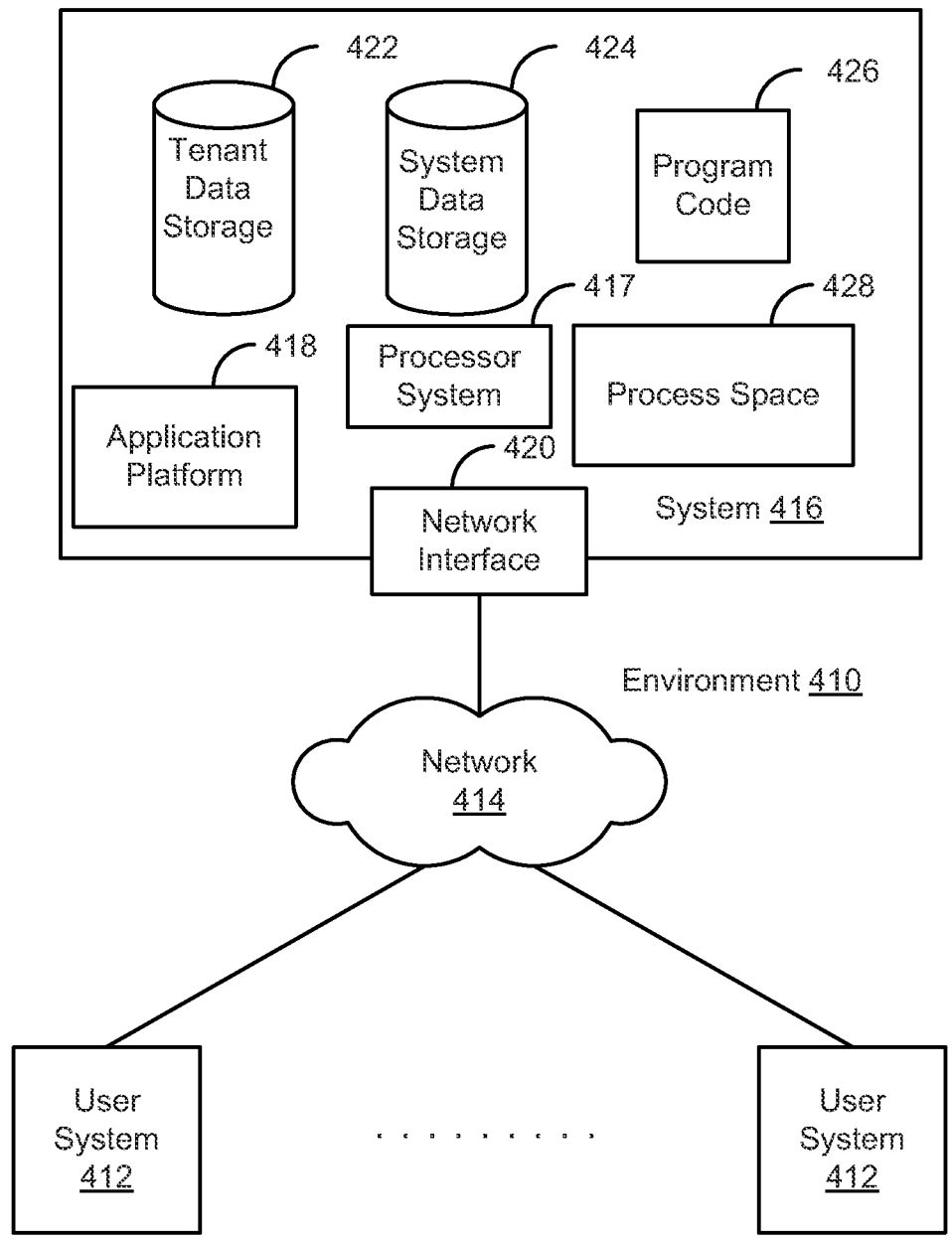
FIG. 4 illustrates a block diagram of an example of an environment wherein an on-demand database system might be used.

FIG. 4 illustrates a block diagram of an environment 410 wherein an on-demand database system might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database system exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database system, which is system 416.

An on-demand database system, such as system 416, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database system 416 may include an application platform 418 that enables creation, managing and executing one or more applications developed by the provider of the on-demand database system, users accessing the on-demand database system via user systems 412, or third party application developers accessing the on-demand database system via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser. Netscape's Navigator browser, Opera's browser, or a WAR-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
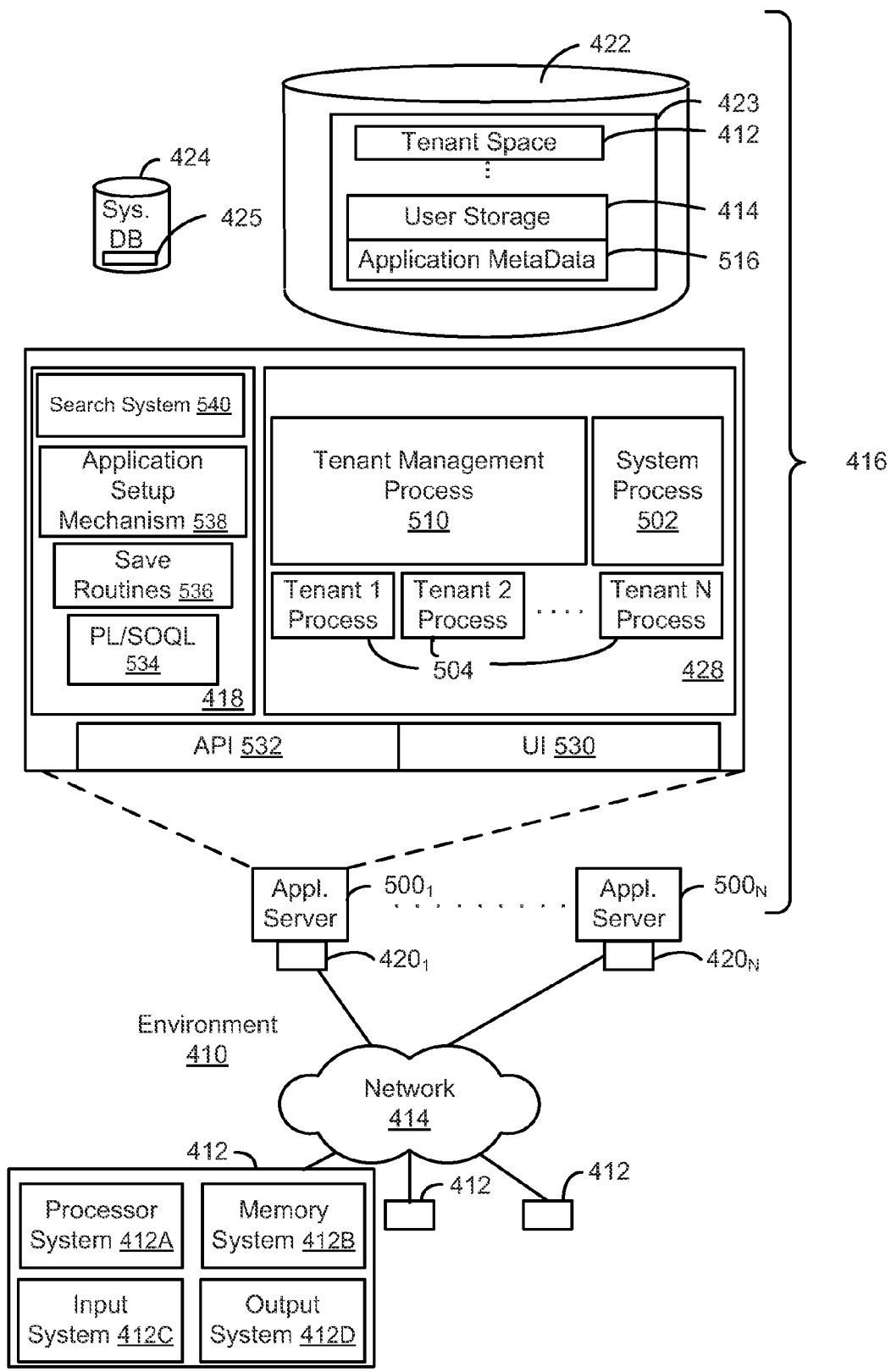
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input, system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

in certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for dynamically correcting grammar associated with text, the method comprising:

receiving a request from a user to change text within an application;

changing all instances of the text within the application, according to the request; and dynamically correcting grammar associated with the changed text when the changed text is displayed to the user, including dynamically correcting the display of additional text associated with the changed text, according to one or more rules associated with a language of the changed text.

2. The computer program product of claim 1, wherein the computer program product is operable such that the application is installed on a multi-tenant on-demand database system.

3. The computer program product of claim 1, therein the text within the application includes an identifier displayed by the application.

4. The computer program product of claim 1, wherein the computer program product is operable such that the user provides multiple forms of the changed text.

5. The computer program product of claim 1, wherein the computer program product is operable such that the user provides one or more of the singular form of the changed text, the plural form of the changed text, the nominative form of the changed text, the accusative form of the changed text, the genitive form of the changed text, and the dative form of the changed text.

6. The computer program product of claim 1, wherein the request to change the text includes a request to change the gender of the text.

7. The computer program product of claim 1, wherein the request to change the text includes a request to change the wording of the text from a word starting with a vowel to a word starting with a consonant.

8. The computer program product of claim 1, wherein the request to change the text includes a request to change the text from singular to plural.

9. The computer program product of claim 1, wherein the computer program product is operable such that the text is stored in a database associated with the application, where such text is dynamically retrieved by the application to be displayed as needed.

10. The computer program product of claim 9, wherein the computer program product is operable such that the text stored in the database is replaced with the changed text.

11. The computer program product of claim 1, wherein the one or more rules associated with the language of the changed text include grammatical rules that are stored as metadata within a grammar engine.

12. The computer program product of claim 1, wherein the computer program product is operable such that the grammar is dynamically corrected utilizing a grammar engine.

13. The computer program product of claim 12, wherein the computer program product is operable such that the grammar engine analyzes the text to be displayed within the application and dynamically corrects the additional text associated with the changed text.

14. The computer program product of claim 1, wherein the language of the text includes a language in which the text is written.

15. The computer program product of claim 1, wherein the rules associated with the language of the text include one or more grammatical rules.

16. The computer program product of claim 1, wherein the rules associated with the language of the text include the declension used within the language.

17. The computer program product of claim 1, wherein the computer program product is operable such that a plurality of languages is supported by the application.

18. The computer program product of claim 17, wherein the computer program product is operable such that each of the languages supported by the application have associated rules and are categorized by their associated rules.

19. A method, comprising:
   receiving a request from a user to change text within an application;
   changing all instances of the text within the application, according to the request, utilizing a processor; and
   dynamically correcting grammar associated with the changed text when the changed text is displayed to the user, including dynamically correcting the display of additional text associated with the changed text, according to one or more rules associated with a language of the changed text.

20. An apparatus, comprising:
   a processor for:
      receiving a request from a user to change text within an application;
      changing all instances of the text within the application, according to the request; and
      dynamically correcting grammar associated with the changed text when the changed text is displayed to the user, including dynamically correcting the display of additional text associated with the changed text, according to one or more rules associated with a language of the changed text.

* * * * *